US008257774B2

(12) United States Patent
Salado Font et al.

(10) Patent No.: US 8,257,774 B2
(45) Date of Patent: Sep. 4, 2012

(54) MYCOTOXIN ADSORBENT

(75) Inventors: Silvia Maria Salado Font, Villanueva del Pardillo (ES); Marie Helene Guynot de Boismenu, Vinyols i els Arcs (ES); Francisco Medina Cabello, Tarragona (ES); Isabel Salla Cabau, Els Omellons (ES); Jesus Eduardo Sueiras Romero, Vallmoll (ES)

(73) Assignee: Adiveter, S.L., Reus (ES)

( * ) Notice: Subject to any disclaimer, the term of this patent is extended or adjusted under 35 U.S.C. 154(b) by 147 days.

(21) Appl. No.: 12/823,844

(22) Filed: Jun. 25, 2010

(65) Prior Publication Data

US 2010/0330235 A1 Dec. 30, 2010

(30) Foreign Application Priority Data

Jun. 29, 2009 (EP) .................................... 09164063

(51) Int. Cl.
*A23K 1/18* (2006.01)
*A23K 1/175* (2006.01)

(52) U.S. Cl. ........... 426/654; 426/62; 426/271; 426/807

(58) Field of Classification Search .................... 426/62, 426/271, 654, 807
See application file for complete search history.

(56) References Cited

U.S. PATENT DOCUMENTS

| | | | | |
|---|---|---|---|---|
| 5,165,946 A | | 11/1992 | Taylor et al. | |
| 6,045,834 A | * | 4/2000 | Howes et al. | 426/2 |
| 2003/0015473 A1 | | 1/2003 | Murphy et al. | |

FOREIGN PATENT DOCUMENTS

| | | | |
|---|---|---|---|
| WO | 99/53772 | A1 | 10/1999 |
| WO | 02/052950 | A1 | 7/2002 |
| WO | 2007/016646 | A1 | 2/2007 |

OTHER PUBLICATIONS

R.M. Natour, et al., "Adsorption Efficiency of Diatomaceous Earth for Mycotoxin", Arab Gulf Journal of Scientific Research, 1998, pp. 113-127, vol. 16, No. 1.

Alexander Huwig, et al., "Mycotoxin Detoxication of Animal Feed by Different Adsorbents", Toxicology Letters, Apr. 2001, pp. 179-188, vol. 122, Issn: 0378-4274, Elsevier Biomedical Press, Amsterdam, NL.

W.F. Jaynes, et al., "Aflatoxin $B_1$ Adsorption by Clays from Water and Corn Meal", Applied Clay Science, Mar. 2007, pp. 197-205, vol. 36, No. 1-3, Elsevier Science, NL.

European Search Report for EP No. 09164063 dated Dec. 16, 2009.

* cited by examiner

*Primary Examiner* — Chhaya Sayala
(74) *Attorney, Agent, or Firm* — Sughrue Mion, PLLC

(57) ABSTRACT

The present invention relates to a mycotoxin adsorbent, as well as to the process for the preparation of said adsorbent. The adsorbent of the invention is based on the combination of an organic silicate with an amorphous structure and dodecylamine, that is to say, a primary amine having an apolar, linear, aliphatic long-chain of twelve carbon atoms. The invention also relates to the use of said adsorbent in feeds for the adsorption of mycotoxins, especially for the adsorption of mycotoxins such as aflatoxins, zearalenone, ochratoxin A or fumonisin B1. Furthermore, the invention relates, on the one hand, to a feed additive comprising said adsorbent and, on the other hand, to the feeds comprising said additive.

9 Claims, 2 Drawing Sheets

Figure 1: Interactions between the different adsorbents and phenylalanine
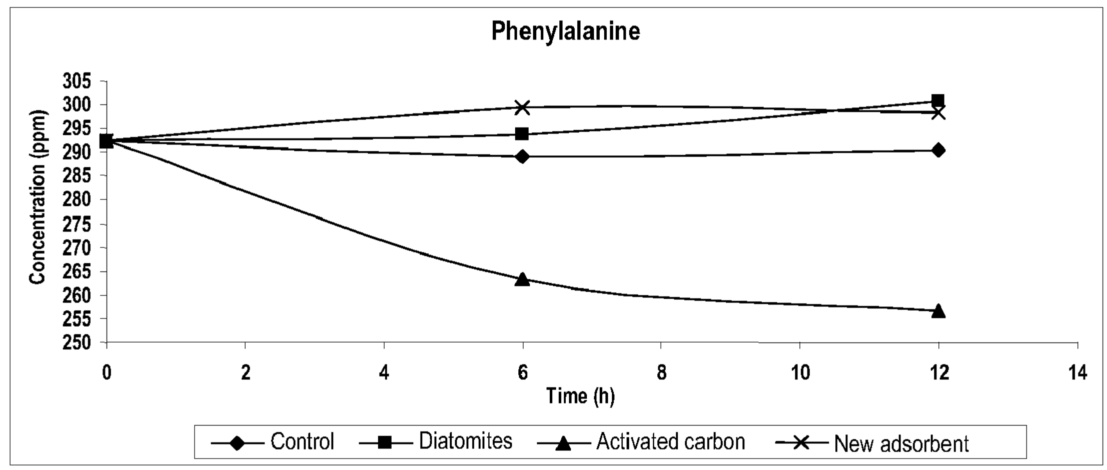
Figure 2: Interactions between the different adsorbents and thyroxine
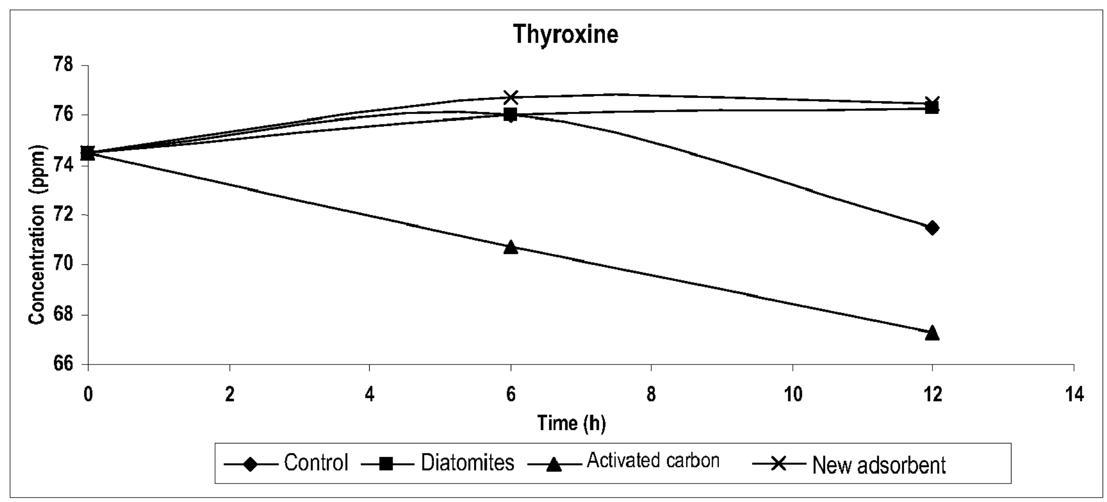

Figure 3: Interactions between the different adsorbents and arginine
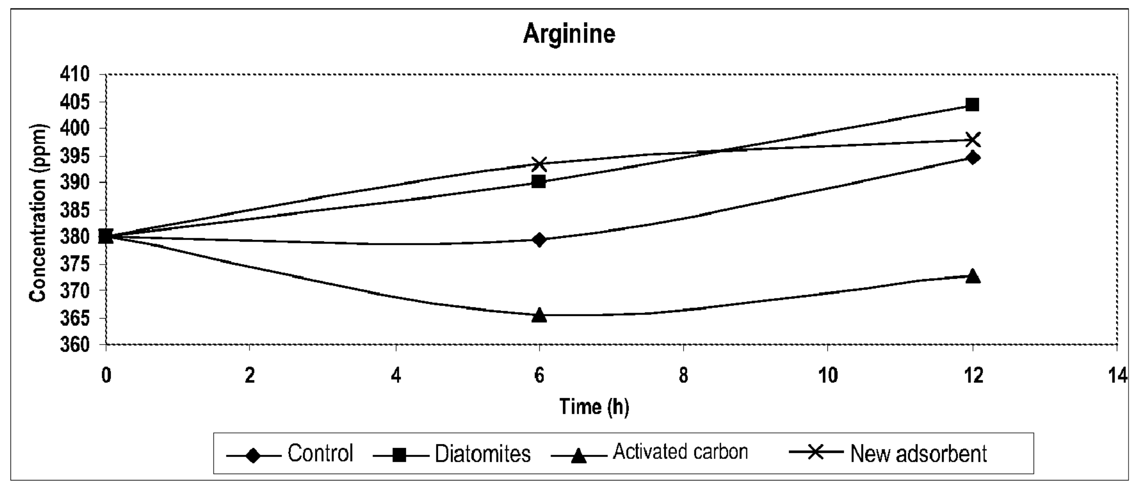
Figure 4: Interactions between the different adsorbents and oxytetracycline
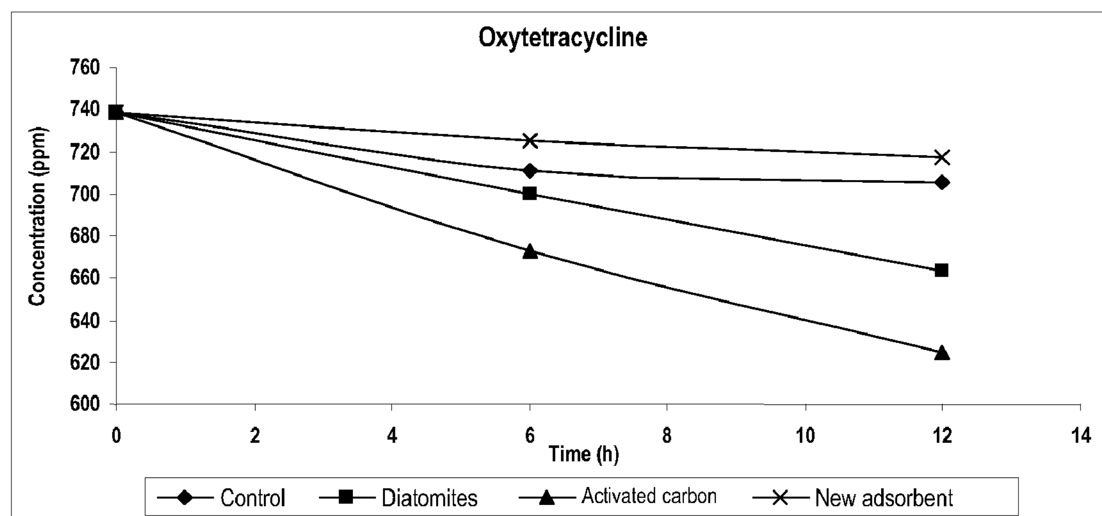

MYCOTOXIN ADSORBENT

TECHNICAL FIELD OF THE INVENTION

The present invention relates to a mycotoxin adsorbent, as well as to the process for the preparation of said adsorbent. The invention also relates to the use of said adsorbent in feeds for the adsorption of mycotoxins, especially for the adsorption of mycotoxins such as aflatoxins, zearalenone, ochratoxin A and fumonisin B1. Furthermore, the invention relates, on the one hand, to a feed additive comprising said adsorbent and, on the other hand, to the feeds comprising said additive.

BACKGROUND OF THE INVENTION

Mycotoxins (from the Greek word μύκηζ (mykes, mukos) "fungus") are toxins produced by an organism of the Fungi Kingdom, including mushrooms, molds and yeasts. They develop in agricultural products, and especially in species of fruit and cereal grains. Even though their harmful effects have been acknowledged for centuries, only in the last three decades has society become fully aware of exactly what they represent for the economy and health.

When the conditions are favorable, fungi proliferate, forming colonies and at specific levels of moisture, temperature or oxygen in the air, mycotoxin levels can become high. Mycotoxins are compounds greatly differing in their chemical, biological and toxicological properties, therefore their danger greatly varies. While some fungi produce harsh toxins, others are deadly, cause identifiable diseases or health problems, weaken the immune system without producing specific systems or act as allergenics or irritants. There are also mycotoxins which have no known effect on the human organism.

Furthermore mycotoxins are ubiquitous compounds, which means that the problem of mycotoxicosis begins in the field and continues during the entire transformation-marketing chain, reaching the consumer. The consumption of feeds prepared with ingredients such as corn, barley, wheat, oats and rye, oilseed, peanut seed, cotton seed or palm seed cakes contaminated with mycotoxins causes both mycotoxicosis in animals, and problems of mycotoxin residues in derivative products, such as milk, meat and eggs. Therefore, the contamination of cereals and any product susceptible of comprising mycotoxins due to fungi causes not only enormous losses after the harvest, but it is also a source of toxic and harmful substances for humans.

Lastly, mycotoxins resist decomposition, so they remain in the food chain in meats and dairy products. Even temperature treatments, such as cooking and freezing, do not destroy all the mycotoxins.

Therefore, many mycotoxins have a harmful effect for health, first of all on animals fed with cereals that could be infected, but also, second of all, on people through the food chain. In fact, cases of acute diseases in humans, such as aflatoxin-induced hepatitis, vascular and enteric ergotism and mycotoxicosis due to trichothecenes have been reported in different continents. Circumstantial data also link chronic diseases, such as liver and stomach cancer, to the consumption of foods contaminated by aflatoxin and deoxynivalenol.

Additionally, the economic consequences of mycotoxins in terms of food and feed losses, reduction of animal productivity, loss of foreign revenue earnings, increase of the cost of inspection and analyses, injury compensation claims, costs of prevention and control measures are considerable.

Based on the foregoing, there is a need to find prevention and control measures which would ensure that the mycotoxins present in feeds do not reach anyone consuming the contaminated material, thus preventing them from exerting their effect.

The publication "*Prevention of toxic effects of mycotoxins by means of nonnutritive adsorbent compounds*" by Ramos et al. (1996) describes that the mycotoxins from aflatoxin group become fixed, in accordance with their specific molecular structure, with a high specificity in some mineral adsorbents such as zeolite, bentonite, and other aluminosilicates and other minerals (see the publication A. J. Ramos, *Journal of Food Protection*, volume 59(6), 1996, pp. 631-641). This publication corroborates what had already been disclosed in German patent application DE3810004, relating to the use of bentonite for adsorption of mycotoxins in humans or animals, or in U.S. Pat. No. 5,149,549, relating to the use of a clay, montmorillonite, for adsorption of mycotoxins in contaminated foods, or also in European patent application EP1890804, relating to the use of stevensite for adsorbing mycotoxins.

However, adsorption of mycotoxins on non-modified minerals is not efficient for the majority of other mycotoxins.

Other methods which were developed trying to also extend the adsorption capacity of mineral adsorbents to other important mycotoxins (non-aflatoxins), such as, for example, zearalenone, ochratoxins, fumonisins, T2-toxin, deoxynivalenol or vomitoxin, mycotoxin HT-2, or nivalenol, are described below.

Document U.S. Pat. No. 6,165,485 relates to a bentonite-based clay modified with a quaternary amine comprising in its structure a benzol substituent, and which can furthermore be treated with iodine to improve its efficacy as a biocide.

More specifically, in the field of animal feeds, document U.S. Pat. No. 6,045,834 proposes the combination of modified yeast cells and of inorganic minerals such as zeolite, bentonite or aluminum silicate to deactivate mycotoxins present in feeds and, thus, preventing the absorption of the mycotoxins in the animal blood.

In document U.S. Pat. No. 5,639,492, an acid-activated calcium bentonite clay is used to adsorb mycotoxins in feeds.

Document YU P-838/00 describes the use of a clinoptilotite/heulandite-type mineral organically modified with a quaternary amine having a long-chain aliphatic group for adsorbing aflatoxin and non-aflatoxin mycotoxins comprised in animal feeds. The main object in this document underlies a controlled correction of the surface of the mineral, and more specifically of the hydrophilic or hydrophobic nature of the mineral by means of the addition of a controlled amount of a quaternary amine having a long-chain aliphatic group with preferably 18 carbon atoms. The amount of amine added is adapted in accordance with the type of mycotoxins to be adsorbed.

Finally, European patent EP1150767B1, the equivalent of which in Spain is patent ES2201820, should be pointed out. This document relates to a mycotoxin adsorbent, especially for the adsorption of aflatoxins and other mycotoxins (non aflatoxins) in feeds by means of the mixture of a non-modified montmorillonite-type silicate (especially bentonite), and a montmorillonite-type silicate (especially bentonite, or vermiculite) organically modified with quaternary ammonium compounds with at least one $C_{10}$ to $C_{22}$ alkyl group and at least one aromatic substituent. It discloses that, by means of the modification of a layered silicate with a relatively small amount of a quaternary ammonium compound with a long-chain $C_{10}$ to $C_{22}$ alkyl group and at least one aromatic substituent, a significant increase in the performance of the adsorption of aflatoxin and non-aflatoxin mycotoxins can be achieved. It also discloses that acid-activated bentonites can be used.

However, it should be pointed out that the drawback of this type of mineral adsorbent such as zeolite, bentonite, aluminum silicates . . . is that they are usually included at concentrations of 1-2% by weight, which reduces the nutritional value of the food. Furthermore, given that their activity is not too much specific, in addition to adsorbing only a narrow range of mycotoxins, they can present selectivity problems leading to an unwanted adsorption of nutrients such as vitamins, minerals and amino acids. As a consequence, there is certain concern due to the fact that the use of some aluminosilicates in feed could adsorb nutrients or micronutrients in the gastrointestinal tract (*Turkish Journal of Veterinary and Animal Sciences,* 2008, 32(3), 183-189).

For example, riboflavin (E101), also known as vitamin B2, is a micronutrient which plays a key role in maintaining good health in humans and animals. One of its functions consists of eliminating harmful substances from the organism, in addition to participating in the metabolism of other vitamins. It has been demonstrated that a high adsorption for this vitamin exits in the interlayer spaces of smectite (*Clays and Clay Minerals*, Vol. 31, No. 6, 435-439, 1983). This adverse nutritional effect is also described in publication *Animal Research*, 51, 2002, 81-99, since the large amounts to be added in order to achieve a noticeable effect reduce the bioavailability of certain vitamins or minerals in the diet.

It is therefore very important to find new products which, on the one hand, have efficient properties in the adsorption of a broad spectrum of mycotoxins, without, on the other hand, limiting the bioavailability of nutrients and micronutrients in animals.

Based on the foregoing and, furthermore, knowing that the contamination of feeds due to mycotoxins represents a very serious problem since it has such a very important impact on the economy and on health, it is necessary to continue investigating to obtain an efficient and specific adsorption of mycotoxins present in feeds which is easy to put into practice.

The object of the present invention is to provide an alternative mycotoxin adsorbent, suitable for feeds, which effectively adsorbs any type of mycotoxin in a selective manner to prevent the unwanted interaction with nutrients, and which, furthermore, has a simplified process of preparation in order to be easily carried out into practice, and with a low economic cost.

EXPLANATION OF THE INVENTION

After thorough research, the authors of the present invention have surprisingly found that the mycotoxin adsorbent according to claim 1 is very efficient for the adsorption of any type of mycotoxin comprised in animal feeds and, furthermore, in a selective manner, to prevent the unwanted interaction with nutrients.

The mycotoxin adsorbent is characterized in that it comprises an organic silicate, having an amorphous structure, modified with a primary amine having an apolar, linear, aliphatic long-chain of twelve carbon atoms, called dodecylamine, or also laurylamine or cocoamine.

The silica compounds of an organic origin and amorphous structure are selected from the group consisting of diatomaceous earth, radiolarians, silicoflagellates and siliceous sponges.

In a preferred embodiment of the invention, the silicate with an amorphous structure used in the composition of the mycotoxin adsorbent is diatomaceous earth. Diatomite ($SiO_2.nH_2O$) is a sedimentary siliceous rock having various degrees of consolidation; and it is mainly formed of fossilized remains of microscopic aquatic plants, diatoms.

According to a preferred embodiment of the invention, the mycotoxin adsorbent comprises amongst 85% and 98% by weight of silicate and up to 15% by weight of dodecylamine.

The present invention also relates to a process for the preparation of the previously defined mycotoxin adsorbent, and comprises the following steps:

a) a solution of dodecylamine in methanol is slowly added to an organic silicate with an amorphous structure, b) the mixture obtained in step a) is homogenized, c) the mixture obtained in step b) is left to dry, and d) the dry product of step c) is ground until obtaining a product in powder form.

Another object of the present invention is the use of the adsorbent for the adsorption of mycotoxins in feeds intended for any animal species.

According to another aspect, the present invention relates to any feed additive comprising the previously defined mycotoxin adsorbent.

According to a preferred embodiment of the invention, the feed additive furthermore comprises at least one compound selected from the group consisting of yeast extracts, enzymes, vitamins, minerals, probiotics, prebiotics, and mineral or organic excipients.

Another object of the present invention is an animal feed comprising the previously defined additive.

In a preferred embodiment according to the invention, the animal feed comprises up to 2% by weight of the additive.

BRIEF DESCRIPTION OF THE DRAWINGS

For the purpose of better illustrating the advantages and properties of the mycotoxin adsorbent object of the invention, several graphs are attached as non-limiting examples:

FIG. 1 shows the interactions between the amino acid phenylalanine and the adsorbent of the invention and it is compared with other different adsorbents;

FIG. 2 corresponds to the same type of graph as that of FIG. 1 but with the amino acid thyroxine and it is compared with other different adsorbents;

FIG. 3 corresponds to the same type of graph as that of FIG. 1 but with the amino acid arginine and it is compared with other different adsorbents; and FIG. 4 shows the interactions between the antibiotic oxytetracycline and the adsorbent of the invention and it is compared with other different adsorbents;

DETAILED DESCRIPTION OF THE INVENTION

As explained above, the mycotoxin adsorbent of the invention is based on the combination of an organic silicate with an amorphous structure and dodecylamine, i.e., a primary amine having an apolar, linear, aliphatic long-chain of twelve carbon atoms.

The organic silicate with an amorphous structure can be, for example, diatomaceous earth, radiolarians, silicoflagellates and siliceous sponges.

The organic silicate with an amorphous structure is organically modified exclusively with the primary amine dodecylamine. The inventors investigated other primary amines, also including similar amines with an apolar, linear, long aliphatic chain, but acceptable results of adsorption of mycotoxins were not achieved.

All the materials previously mentioned in the state of the art share a common characteristic: the clay minerals used have defined crystalline structures. Thus, for example, zeolites have structures in the form of channels and cavities and montmorillonite-type clays have a layered structure and a determined distribution of active centers. In contrast, diatomaceous earth has an amorphous structure.

On the other hand, both zeolites and clays have a high cation exchange capacity (CEC) which can be useful for a number of applications though with low selectivity. With regard to the adsorption of mycotoxins, these materials can exchange a large amount of quaternary ammonium salts which could also be useful in the adsorption of mycotoxins.

Nevertheless, diatomaceous earth has a very different behavior compared with zeolites and clays. Diatomaceous earths are not crystalline, mostly having an amorphous shape, and with a cation exchange capacity much lower than that of zeolites and clays (see Table 1).

TABLE 1

CEC Values (meq/100 g) for some materials.

| Material | CEC Value (in meq/100 g) |
|---|---|
| Zeolite | up to 500 |
| Bentonite | 80 |
| Montmorillonite | 80-200 |
| Vermiculite | 100-200 |
| Diatomaceous earth | Less than 20 |

In view of the results of this table, it did not seem effective to perform an exchange with quaternary amines, since the amount of amine that would have remained on the diatomaceous earth would have been very small and it could be expected that the resulting adsorbent did not have good properties for the adsorption of mycotoxins.

The innovative idea of the investigators of the present invention is based on having chosen an anchoring of primary amines by means of Van der Waals interaction forces between the hydroxyl groups of the free silanols present in the surface of the diatomaceous earth and the amino group of the primary amine. There is no cationic exchange as in the case of the adsorbents of the state of the art. The fact of using a primary amine allows the existence of an interaction due to an inductive effect between the free electrons of the nitrogen of the amine and the structure of the mycotoxin, which fact seems to favor the adsorption of mycotoxins in a more favorable manner than if the amine were in cationic form.

Finally, all the adsorbents found in the literature have very elevated surface areas in comparison with diatomaceous earth. Therefore, these results with a material having a low surface area were not expected.

The investigators of the present invention surprisingly reached the conclusion that, the type of amine to be used, and the form of anchoring it in the surface of diatomaceous earth, seem to be the most important factors of the high selectivity of these materials in the adsorption of mycotoxins.

The sum of all these factors allows stating that the results obtained were not foreseeable from the documentation present in the state of the art. The documents of the state of the art, such as, for example, the closest document ES2201820, do not contemplate this option of choosing a primary amine to modify the silicate, nor do they consider the possibility of using a silicate with a low cationic exchange to prevent the interaction with nutrients.

In addition, it should also be pointed out that the process of obtaining the adsorbent according to the invention is simplified in comparison with that of any other process of the state of the art. Indeed, it does not involve performing a cationic exchange, since dodecylamine is a neutral amine and it does not participate in cationic exchange processes. Due to its apolar, linear, aliphatic chain of twelve carbon atoms, dodecylamine has a hydrophobic character. The interaction between the diatomaceous earth-type silicate and the amine is based on Van der Waals forces. Thus, in the process of obtaining the adsorbent of the invention only two reactants are used, silicate and dodecylamine.

The following examples illustrate but do not limit the scope of the present invention.

EXAMPLE 1

Synthesis of Diatomaceous Earth Modified with Dodecylamine at 5% by Weight

An example of the preparation of a mycotoxin adsorbent according to the present invention is described below.

50 g of diatomaceous earth are weighed in a glass container. 40 mL of a solution of dodecylamine (DDA) in methanol at a concentration of 62.5 mg/mL are slowly added. The mixture is homogenized with a spatula until all the solid is impregnated with the liquid. The mixture is left to dry in an oven at 103±2° C. for approximately 24 hours. The dry product is ground and homogenized in a mortar until obtaining a fine powder.

EXAMPLE 2

Adsorption of the Mycotoxins by Means of In Vitro Testing Simulating Physiological Conditions of pH, Temperature, Transit Time, Ions and Digestive Enzymes The following tables show the results of adsorption of the mycotoxins zearalenone (see Table 2), ochratoxin (see Table 3) and fumonisin B1 (see Table 4), obtained with natural, i.e., non-modified, diatomaceous earth and with diatomaceous earth modified with dodecylamine at different concentrations comprised between 1% and 20% by weight.

TABLE 2

Adsorption of the mycotoxin zearalenone

| | ZEARALENONE 1500 ng/ml | | | |
|---|---|---|---|---|
| Type of adsorbent | adsorption at 1% | adsorption at 0.5% | adsorption at 0.2% | adsorption at 0.1% |
| Natural diatomite | 2.8 (2.0) | * | * | * |
| Diatomite + 1% DDA | * | 33.7 (1.1) | * | * |
| Diatomite + 2% DDA | * | 48.4 | * | * |
| Diatomite + 5% DDA | * | 81.3 (4.5) | 53.8 (6.5) | * |
| Diatomite + 8% DDA | * | 81.4 (3.6) | * | * |
| Diatomite + 20% DDA | 91.6 (3.1) | 85.4 (0.7) | 57.1 (1.1) | 37.3 (2.4) |

TABLE 3

| Adsorption of the mycotoxin ochratoxin | | | | | |
|---|---|---|---|---|---|
| | OCHRATOXIN 150 ng/ml | | | | |
| Type of adsorbent | adsorption at 1% | adsorption at 0.5% | adsorption at 0.2% | adsorption at 0.1% | adsorption at 0.05% |
| Natural diatomite | 0.0 (0.0) | * | * | * | * |
| Diatomite + 1% DDA | * | 17.7 (0.3) | * | * | * |
| Diatomite + 2% DDA | * | 37.35 | * | * | * |
| Diatomite + 5% DDA | * | 92.1 (0.4) | 73.8 (1.9) | 31.2 (3.2) | 16.3 (4.7) |
| Diatomite + 8% DDA | * | 92.5 (0.5) | 79.9 (1.1) | 51.2 (5.5) | 22.9 (1.9) |
| Diatomite + 20% DDA | * | 92.5 (0.8) | | | |

TABLE 4

| Adsorption of the mycotoxin fumonisin B1 | | | |
|---|---|---|---|
| | FUMONISIN B1 1800 ng/ml | | |
| Type of adsorbent | adsorption at 1% | adsorption at 0.5% | adsorption at 0.2% |
| Natural diatomite | 1.5 (0.4) | * | * |
| Diatomite + 1% DDA | * | * | * |
| Diatomite + 2% DDA | * | 45.8 (0.7) | * |
| Diatomite + 5% DDA | * | 74.2 (37.8) | * |
| Diatomite + 8% DDA | * | 88.4 | 82.8 (16.5) |
| Diatomite + 20% DDA | * | 89.3 (1.1) | * |

It is inferred, from these results, that the natural diatomaceous earth used in a feed additive at different concentrations has a very low capacity for the adsorption of mycotoxins. For this reason, a person skilled in the art would not have thought to use this material as a starting point to try to obtain an efficient mycotoxin adsorbent, since the starting material does not even have a very low adsorption of mycotoxins but rather nil adsorption. However, as can be seen in Table 2, the diatomaceous earth modified with dodecylamine surprisingly does show a very efficient adsorption of mycotoxins after a dodecylamine concentration of 5% by weight. These results are achieved when the modified diatomaceous earth is at least 0.2% by weight of the end product (for example, a feed).

EXAMPLE 3

Adsorption of the Nutrients

Several assays have been conducted to check the selectivity of diatomaceous earth modified with dodecylamine. The results of the interaction between the adsorbent of the invention and some amino acids, some minerals and an antibiotic are described below.

Materials:

Three substrates were evaluated:

natural diatomaceous earth (ND)

activated carbon (AC), and diatomaceous earth modified with dodecylamine (M)

Interactions with the Nutrient Solution:

The interactions were evaluated by means of equilibrium assays. 0.5 g and 5 g of each substrate were mixed in beakers with 500 mL of a nutrient solution (FRESUBIN ORIGINAL FIBER) with a dry matter content of 16%. This solution comprises proteins, minerals and vitamins, and is widely used for humans as enteral nutrition. 24 g/L of buffered peptone water were added to increase the amount of free amino acids. Furthermore, 1 mL of a solution of oxytetracycline at 25 g/L was added in each replica to provide an initial oxytetracycline content of 255 ppm (on dry matter) or 50 ppm (on wet matter).

The suspensions were mixed constantly (30 rpm) in the dark at 38° C. to prevent a concentration gradient. Several samples of about 100 mL were extracted at different times of liquid/solid interaction (at first, after 6 hours and after 12 hours) to determine the amount of amino acids, anions/cations and the antibiotic oxytetracycline, in the solution. The samples were centrifuged at 4500 rpm for 15 minutes and samples of the liquid supernatant were taken and stored at −20° C. for the following analyses:

25 mL for the oxytetracycline analyses 20 mL for the amino acid analyses, and the rest was dried and ground to perform the mineral analysis.

The different incubation samples are shown in the following Table 5:

TABLE 5

| Incubation samples | | | | | |
|---|---|---|---|---|---|
| | Abbreviation | Volume of FRESUBIN (mL) | Amount of adsorbent (g) | Amount of oxytetracycline (mL) | Extraction of samples (hours) |
| Negative control (enteral solution) | CN | 500 | 0 | 1 | 0, 6, 12 |
| 0.5% natural diatomite | ND1 | 500 | 0.625 | 1 | 6, 12 |
| 5% natural diatomite | ND2 | 500 | 6.25 | 1 | 6, 12 |
| 0.5% activated carbon | AC1 | 500 | 0.625 | 1 | 6, 12 |
| 5% activated carbon | AC2 | 500 | 6.25 | 1 | 6, 12 |

TABLE 5-continued

| Incubation samples | | | | | |
|---|---|---|---|---|---|
| | Abbreviation | Volume of FRESUBIN (mL) | Amount of adsorbent (g) | Amount of oxytetracycline (mL) | Extraction of samples (hours) |
| 0.5% adsorbent of the invention | M1 | 500 | 0.625 | 1 | 6, 12 |
| 5% adsorbent of the invention | M2 | 500 | 6.25 | 1 | 6, 12 |

Results

In those parameters in which a change was detected in the nutrient content, the evolution over time of said variation is described. To aid in interpreting the results, the data from the two concentrations of one and the same product were analyzed together.

Interactions with the Amino Acids Phenylalanine, Thyroxine and Arginine

No differences were observed in the concentration of the amino acids (see FIGS. 1, 2 and 3). Accordingly, there is no interaction between the amino acids phenylalanine, thyroxine and arginine and the adsorbent of the invention. Interactions were observed only with activated carbon.

Interactions with the Minerals Na, K, Ca, P, Mg, Fe, Zn, and Mn

The Na, K, Ca, P, Mg, Fe, Zn, and Mn concentrations remained constant in the samples extracted at different time intervals. It can be concluded that there is no adsorption of these ions by any of the different adsorbents assayed, including the adsorbent of the invention.

Interactions with the Antibiotic Oxytetracycline

According to FIG. 4, it is inferred that there is no interaction between the adsorbent of the invention and oxytetracycline. Natural diatomites show slight adsorption after 12 hours of incubation. Activated carbon, used as a positive control, shows considerable adsorption in only 6 hours of incubation.

As can be observed in all the figures, although the activated carbon used in the assays as a positive control of adsorption caused adsorption of all the indicated nutrients, the new additive did not modify the concentration of said nutrients, pointing to an absence of interaction with them.

In conclusion, not only has a new mycotoxin adsorbent material been developed, but so has a simplified process for the preparation thereof (see Preparation Example 1). This new organic silicate-based material with an amorphous structure and modified with dodecylamine surprisingly, and in a very efficient manner, adsorbs any type of mycotoxin, which was not foreseeable knowing that a silicate with an amorphous structure and not organically modified does not at all interact with mycotoxins (see Example 2). Furthermore, the adsorbent of the invention has the advantage that it does not alter the bioavailability of the nutrients of the consumed feed, which are essential for the health of the animals ingesting the feed with an additive comprising the adsorbent of the invention (see results obtained in Example 3).

The invention claimed is:

1. A mycotoxin adsorbent comprising an organic silicate, having an amorphous structure, organically modified with dodecylamine, wherein the organic silicate with an amorphous structure is selected from the group consisting of diatomaceous earth, radiolarians, silicoflagellates and siliceous sponges.

2. The mycotoxin adsorbent according to claim 1, wherein the organic silicate with an amorphous structure is diatomaceous earth.

3. The mycotoxin adsorbent according to claim 1, comprising between 85% and 98% by weight of silicate and up to 15% by weight of dodecylamine.

4. A process for the preparation of the mycotoxin adsorbent according to claim 1, comprising the following steps:

a) a solution of dodecylamine in methanol is slowly added to an organic silicate with an amorphous structure, b) the mixture is homogenized, c) the mixture obtained in step b) is left to dry, and d) the dry product of step c) is ground until obtaining a product in powder form.

5. A method for the adsorption of mycotoxins in animal feed comprising combining the adsorbent according to claim 1 with an animal feed.

6. A feed additive comprising the mycotoxin adsorbent defined according to claim 1.

7. The feed additive according to claim 6, further comprising at least one compound selected from the group consisting of yeast extracts, enzymes, vitamins, minerals, probiotics and prebiotics.

8. An animal feed comprising the additive defined in claim 6.

9. The animal feed according to claim 8, comprising up to 2% by weight of the additive.

* * * * *